US008855810B2

(12) United States Patent
Chuah

(10) Patent No.: US 8,855,810 B2
(45) Date of Patent: Oct. 7, 2014

(54) APPARATUS AND METHOD FOR TRANSFERRING GLOVES

(71) Applicant: Pentamaster Engineering SDN BHD, Bayan Lepas Pulau Pinang (MY)

(72) Inventor: Choon Bin Chuah, Bayan Lepas Pulau Pinang (MY)

(73) Assignee: Pentamaster Engineering SDN BHD (MY)

( * ) Notice: Subject to any disclaimer, the term of this patent is extended or adjusted under 35 U.S.C. 154(b) by 0 days.

(21) Appl. No.: 13/897,917

(22) Filed: May 20, 2013

(65) Prior Publication Data

US 2013/0325169 A1 Dec. 5, 2013

(30) Foreign Application Priority Data

Jun. 5, 2012 (MY) ................................ 2012700339

(51) Int. Cl.

| | |
|---|---|
| *G06F 7/00* | (2006.01) |
| *B25J 9/16* | (2006.01) |
| *B25J 9/00* | (2006.01) |
| *B25J 15/00* | (2006.01) |
| *A41D 19/04* | (2006.01) |

(52) U.S. Cl.
CPC .............. *B25J 9/0093* (2013.01); *B25J 9/1697* (2013.01); *A41D 19/04* (2013.01); *B25J 15/0052* (2013.01); *Y10S 901/47* (2013.01)
USPC ............. 700/230; 134/113; 414/730; 223/57; 901/47

(58) Field of Classification Search
USPC .......................................................... 700/230
See application file for complete search history.

(56) References Cited

U.S. PATENT DOCUMENTS

| | | | | |
|---|---|---|---|---|
| 5,219,264 | A * | 6/1993 | McClure et al. ............... | 414/730 |
| 6,932,253 | B2 * | 8/2005 | Sato .............................. | 223/111 |
| 2003/0019891 | A1 * | 1/2003 | Hutterly et al. ................. | 223/57 |
| 2010/0263695 | A1 * | 10/2010 | Hampe ......................... | 134/113 |
| 2012/0204517 | A1 * | 8/2012 | Stollery et al. ................. | 53/447 |
| 2012/0207577 | A1 * | 8/2012 | Stollery et al. ............. | 414/792.9 |

\* cited by examiner

*Primary Examiner* — Gene Crawford
*Assistant Examiner* — Kyle Logan
(74) *Attorney, Agent, or Firm* — Suzannah K. Sundby, Esq.; Canady + Lortz LLP

(57) ABSTRACT

The present invention relates to an apparatus for transferring a glove (100) from a conveyor (200) characterized by: a camera (10); a pick-up assembly (20) comprising a pair of inner grippers (21) and two pairs of outer grippers (22); a pair of sensors (30); a robotic arm (40) mounted with the pick-up assembly (20); a processor. The present invention also relates to a method for transferring a glove (100) from a conveyor (200), characterized by the steps of: locating a cuff (101) of the glove (100) on the conveyor (200) by capturing an image on the conveyor with a camera (10) and analyzing the image with a processor; using a robotic arm (40) to move a pick-up assembly (20) to the located cuff (101); gripping the cuff (101) with a pair of inner grippers (21) of the pick-up assembly (20) and lifting the glove (100) by retracting the pair of inner grippers (21); detecting the glove (100) position by using a pair of sensors (30); opening the glove (100) by grabbing and sliding apart the two pairs of outer grippers (22); shifting the glove (100) towards a workstation (300) by using the robotic arm (40); transferring the glove (100) to the workstation (300) by engaging the glove (100) to the workstation (300).

14 Claims, 4 Drawing Sheets

APPARATUS AND METHOD FOR TRANSFERRING GLOVES

BACKGROUND OF THE INVENTION

1. Field of the Invention

This invention relates to a glove transferring technology, and more particularly to an apparatus and method for transferring gloves from a conveyor to a workstation.

2. Description of Related Arts

Rubber gloves manufacturing and processing technology has been around since decades ago. Post manufacturing processing such as quality inspection is often needed for newly synthesised gloves and used gloves collected for reprocessing. This process involves mounting the gloves to a holding means which is moved by a conveyor means for undergoing a series of stages, for example, inflation leakage test and sterilization.

U.S. Pat. No. 3,820,383 disclosed an apparatus for inspecting gloves to filter out the defective gloves. The apparatus includes a mounting member on a conveyor mechanism for holding the gloves. Further processing of the gloves then includes inflation, light screen inspection, and defective glove removal. However, the document does not disclose the method of transferring of the glove from a conveyor to the mounting member.

Malaysian Patent Application No. PI 20083650 disclosed a system for processing reusable gloves. The process also involves mounting the gloves to an engaging means that hold the gloves and moves through a series of processing stations. Similarly, this cited document discloses the mounting of the gloves to the engaging means by manually stretching the glove cuffs to the engaging means. The manual transferring of gloves to the workstations would involve a considerable labour cost.

Prior arts exist that describes automated transfer of articles between workstations. U.S. Pat. No. 5,219,264 disclosed an apparatus for transferring an article using a robot system with a gripper assembly. The system also includes a visual inspection system for determining location of the article and directing the robotic arm to pick up the article. However, the system disclosed is not suitable for transferring a flexible article such as a rubber glove because the robotic arm would not be efficient in gripping the glove. Furthermore, gripping the glove at simply any part of the glove would not enable subsequent transferring of the glove to a holding or engaging means of a workstation.

Accordingly, it can be seen in the prior arts that there exists a need to provide a an apparatus and method for transferring gloves from a conveyor means to a working station which is fully automated and specifically suited for gripping and holding gloves.

SUMMARY OF INVENTION

It is an objective of the present invention to provide an apparatus and method for automatically transferring gloves from a conveyor to a workstation.

It is also an objective of the present invention to provide an apparatus and method for transferring gloves from a conveyor to a workstation with a high success rate.

It is yet another objective of the present invention to provide an apparatus and method for locating each piece of the gloves for subsequent processing.

Accordingly, these objectives may be achieved by following the teachings of the present invention. The present invention relates to an apparatus for transferring a glove from a conveyor characterised by: a camera; a pick-up assembly comprising a pair of inner grippers and two pairs of outer grippers; a sensor; a robotic arm mounted with the pick-up assembly; and a processor. The present invention also relates to a method for transferring a glove from a conveyor, characterised by the steps of: locating a cuff of the glove on the conveyor by capturing an image on the conveyor with a camera and analyzing the image with a processor; using a robotic arm to move a pick-up assembly to the located cuff; gripping the cuff with a pair of inner grippers of the pick-up assembly and lifting the glove by retracting the pair of inner grippers; opening the glove by grabbing and sliding apart the two pairs of outer grippers; detecting the glove by using a sensor; shifting the glove towards a workstation by using the robotic arm; transferring the glove to the workstation by engaging the glove to the workstation.

BRIEF DESCRIPTION OF THE DRAWINGS

The features of the invention will be more readily understood and appreciated from the following detailed description when read in conjunction with the accompanying drawings of the preferred embodiment of the present invention, in which.

DETAILED DESCRIPTION OF THE INVENTION

Figure 1:
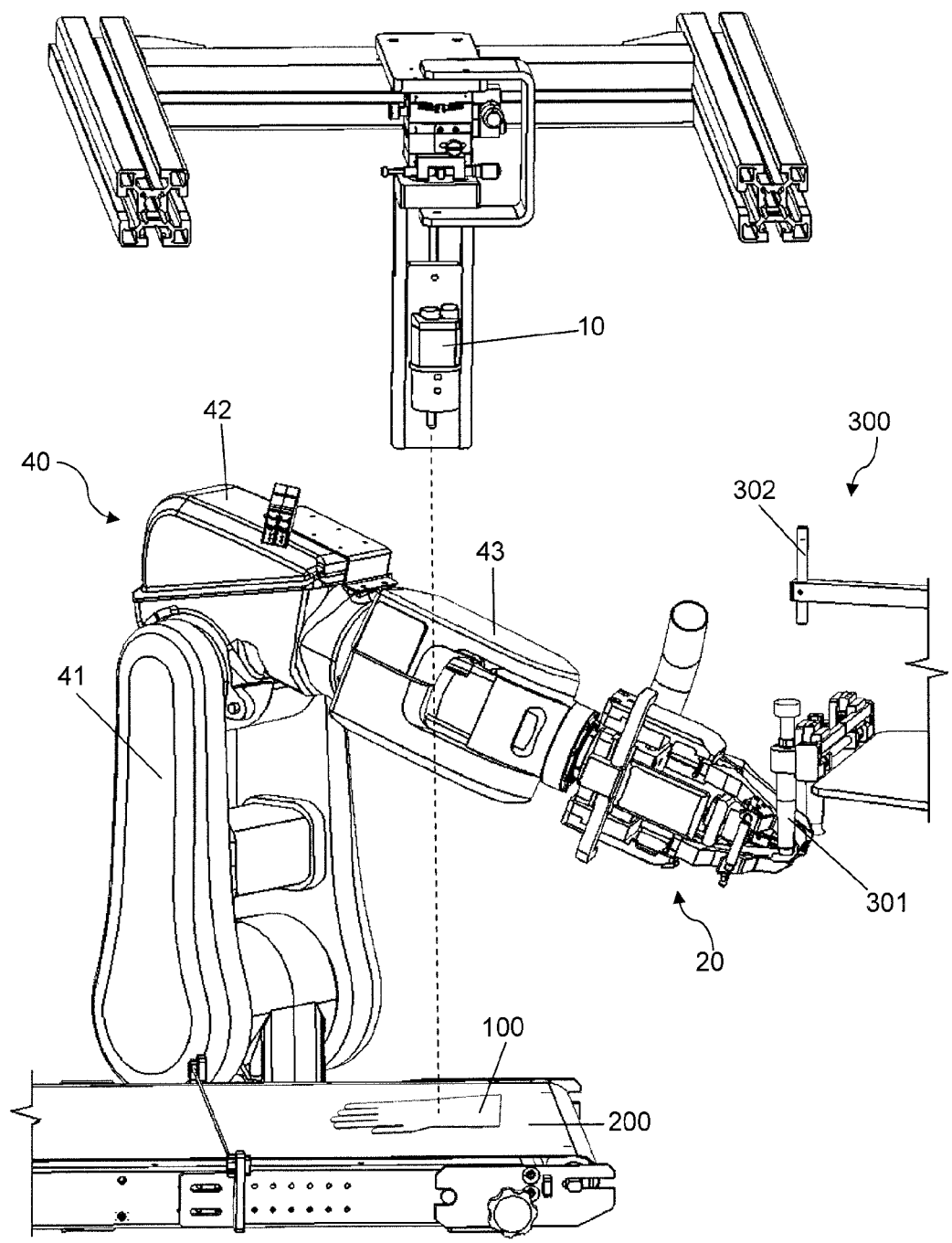
FIG. 1 is a diagram showing an apparatus for transferring gloves from a conveyor.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modification, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations of technical terms are used, these indicate the commonly accepted meanings as known in the technical field. For ease of reference, common reference numerals will be used throughout the figures when referring to the same or similar features common to the figures. The present invention will now be described with reference to FIGS. 1-4.

The present invention relates to an apparatus for transferring a glove (100) from a conveyor (200) characterised by:
a camera (10) for locating a cuff (101) of the glove (100) on the conveyor (200);
a pick-up assembly (20) comprising a pair of inner grippers (21) for gripping the cuff (101) and two pairs of outer grippers (22) for opening the glove (100);

a pair of sensors (30) for determining the position of the glove (100) gripped by the pair of inner grippers (21) and the two pairs of outer grippers (22);

a robotic arm (40) comprising a plurality of joined segments (41, 42, 43), wherein one of the plurality of the segments (43) is mounted with the pick-up assembly (20), for moving the pick-up assembly (20) in different directions;

a processor electrically connected to the camera (10), the pick-up assembly (20), the sensor (30), and the robotic arm (40), for receiving signals from the camera (10) and the pair of sensors (30) and sending commands to the pick-up assembly (20) and the robotic arm (40).

In a preferred embodiment of the apparatus for transferring a glove (100) from a conveyor (200), the camera (10) is a colour charged coupled device camera.

In a preferred embodiment of the apparatus for transferring a glove (100) from a conveyor (200), the camera (10) is a near infrared camera.

In a preferred embodiment of the apparatus for transferring a glove (100) from a conveyor (200), the pair of inner grippers (21) and the two pairs of outer grippers (22) are pneumatically actuated.

In a preferred embodiment of the apparatus for transferring a glove (100) from a conveyor (200), the two pairs of outer grippers (22) have rollers (23).

In a preferred embodiment of the apparatus for transferring a glove (100) from a conveyor (200), the robotic arm (40) comprises a lower segment (41) for horizontal rotation, a middle segment (42) for vertical rotation, and an upper segment (43) for axial rotation.

In a preferred embodiment of the apparatus for transferring a glove (100) from a conveyor (200), the pair of sensors (30) is a pair of optical sensors.

In a preferred embodiment of the apparatus for transferring a glove (100) from a conveyor (200), each sensor of the pair of sensors (30) is provided on an outward side of each pair of the two pairs of outer grippers (22).

In a preferred embodiment of the apparatus for transferring a glove (100) from a conveyor (200), detection of glove (100) by either or both of the pair of sensors (30) indicates the glove (100) is positioned outward of the robotic arm and absence of detection by both of the pair of the sensors indicates the glove (100) is positioned toward the robotic arm.

The present invention also provides a method for transferring a glove (100) from a conveyor (200), characterised by the steps of:

locating a cuff (101) of the glove (100) on the conveyor (200) by capturing an image on the conveyor (200) with a camera (10) and analyzing the image with a processor;

using a robotic arm (40) to move a pick-up assembly (20) to the located cuff (101);

gripping the cuff (101) with a pair of inner grippers (21) of the pick-up assembly (20) and lifting the glove (100) by retracting the pair of inner grippers (21);

opening the glove (100) by grabbing the glove (100) with the two pairs of outer grippers (22) of the pick-up assembly (20) and sliding apart the two pairs of outer grippers (22);

detecting the glove (100) position being held by the pair of inner grippers (21) by using a pair of sensors (30);

rotating the pick-up assembly if the glove (100) is not positioned outward of the robotic arm (40);

shifting the glove (100) towards a workstation (300) by using the robotic arm (40);

transferring the glove (100) to the workstation (300) by engaging the glove (100) to the workstation (300).

In a preferred embodiment of the method for transferring a glove (100) from a conveyor (200), the cuff (101) is in a colour distinctive from the glove (100) colour and the conveyor (200) colour.

In a preferred embodiment of the method for transferring a glove (100) from a conveyor (200), the analysis of the image is conducted by differentiating the colour of the cuff (101) from another part of the image and assigning a coordinate to the cuff (101).

In a preferred embodiment of the method for transferring a glove (100) from a conveyor (200), the image is captured by a near infrared camera to show the difference in thickness of the glove (100) and the cuff (101).

In a preferred embodiment of the method for transferring a glove (100) from a conveyor (200), analysis of image is conducted by differentiating the thickness of the cuff (101) and assigning a coordinate to the cuff (101).

In a preferred embodiment of the method for transferring a glove (100) from a conveyor (200), the opening the glove (100) is facilitated by blowing air into the glove (100) by using an air purge (302) before engaging with the workstation (300).

In a preferred embodiment of the method for transferring a glove (100) from a conveyor (200), the step of engaging the glove (100) to the workstation (300) comprises lifting the glove (100) to a pair of retaining shafts (301) of the workstation (300); moving apart said pair of retaining shafts (301) to stretch and hold the glove (100); releasing the glove (100) from the pair of inner grippers (21) and the two pairs of outer grippers (22).

The present invention relates to the apparatus for transferring gloves (100) from the conveyor (200). For example, the conveyor (200) is connected to a glove (100) loading facility for bringing the gloves (100) to the apparatus.

Figure 2:
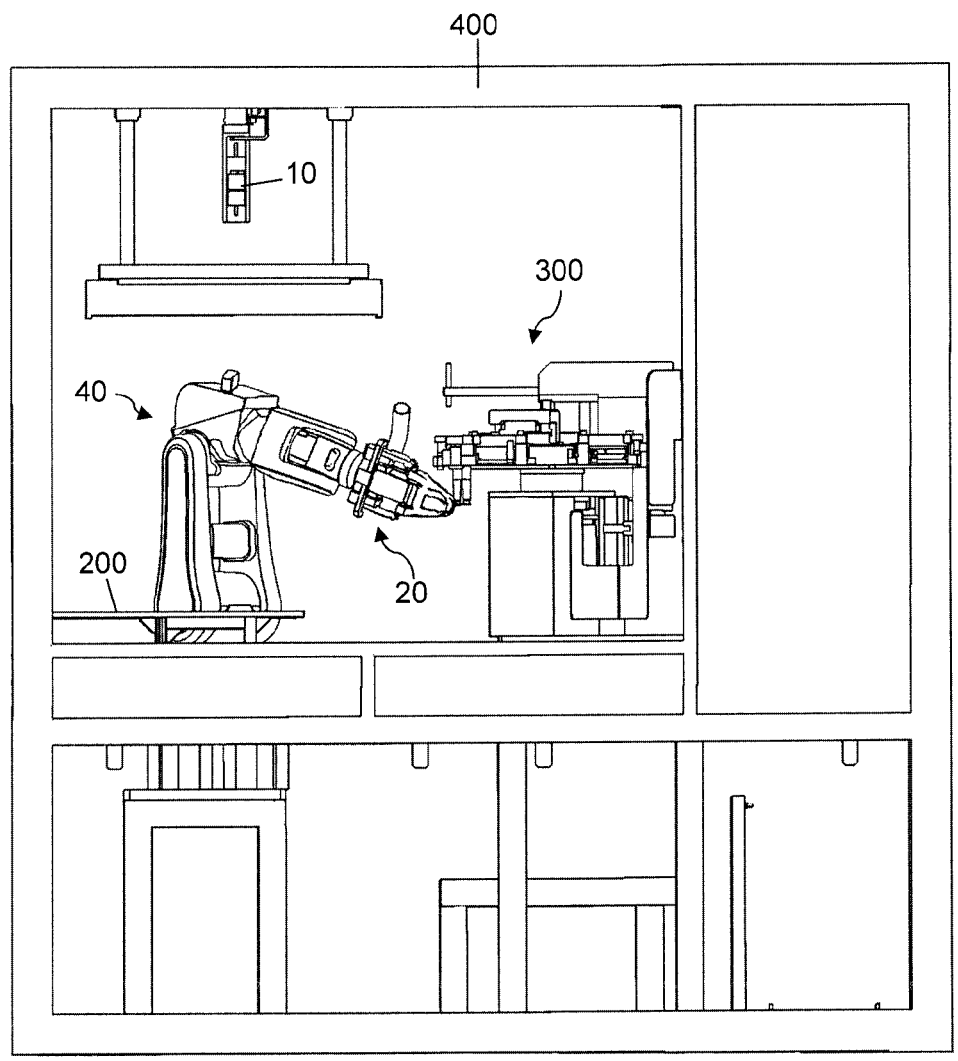
FIG. 2 is a diagram showing the apparatus for transferring gloves supported on a frame structure.

With reference to FIG. 1, the apparatus comprises the camera (10) for locating the cuff (101) of the glove (100) on a designated area on the conveyor (200). The camera (10) is generally located above the conveyor (200) and the robotic arm (40). As can be seen in FIG. 2, the position of the camera (10) may be permanently fixed on a frame structure (400) which provides support to the pick-up assembly (20), the robotic arm (40), the workstation (300), and the conveyor (200) as well. In a preferred embodiment, the camera (10) is a colour charged coupled device (CCD) camera which is able to capture colour images for distinguishing the cuff (101) of the glove (100) which is made in a different colour from the glove (100). In another preferred embodiment, the camera (10) is a near infrared camera which is able to capture image based on near infrared light penetration. The near infrared camera is used together with the near infrared lighting, near infrared sensitive lens, and visible light filter.

The pick-up assembly (20) is mounted on the robotic arm (40) for gripping the glove (100) from the conveyor (200) and holding the glove (100). FIG. 2 shows an enlarged view of the pick-up assembly (20). The pick-up assembly (20) comprises the pair of inner grippers (21) and the two pairs of outer grippers (22). The pair of inner grippers (21) each has a notch (24) specifically suited for gripping and holding the cuff (101) of the glove (100). Each of the two pairs of outer grippers (22) are located adjacent to one side of the pair of inner grippers (21), such that the two pairs of the outer grippers (22) are relatively outward from the pair of inner grippers (21) located centrally. The two pairs of the outer grippers (22) have longer fingers compared to the pair of inner grippers (21) for grabbing the glove (100) body instead of the cuff (101). As an example, the pair of inner grippers (21) and the two pairs of outer grippers (22) are all double acting angular type. In a preferred embodiment, the pair of inner grippers (21) and the two pairs of outer grippers (22) are pneumatically actuated. In a preferred embodiment of the apparatus for transferring a glove (100) from a conveyor (200), the two pairs of outer grippers (22) have rollers (23) for sliding along the glove (100) fabric.

The pair of sensors (30) is used to determine the position of the glove (100) being held by the pair of inner grippers (21). In a preferred embodiment, the pair of sensors (30) is a pair of optical sensors which emits light beam in the direction of the glove (100). In a more preferred embodiment, a fiber optical sensor is used. In a preferred embodiment, each sensor (30) of the pair of sensors (30) is provided on the outward side of each of the two pairs of outer grippers (22). In a preferred embodiment, detection of glove (100) by either or both of the pair of sensors (30) indicates the glove (100) is positioned outward of the robotic arm (FIG. 3) and absence of detection by both of the pair of the sensors (30) indicates the glove (100) is positioned toward the robotic arm.

The robotic arm (40) is used to move the pick-up assembly (20) in different directions. This is achieved by having a plurality of joined segments (41, 42, 43). In a preferred embodiment, the robotic arm (40) comprises the lower segment (41) supported on a surface, which can be tilted or rotated horizontally. The middle segment (42) is connected at a first end to the lower segment (41), and is rotatable vertically relative to the lower segment (41). The upper segment (43) is connected to a second end of the middle segment (42) and is able to rotate axially. The pick-up assembly (20) is mounted on the upper segment (43) of the robotic arm (40).

The processor is electrically connected to the camera (10), the pick-up assembly (20), the sensor (30) and the robotic arm (40) for coordination and control of the apparatus operation. The processor receives signals from the camera (10) and the sensor (30) and sends commands to the pick-up assembly (20) and the robotic arm (40).

The present invention also relates to a method for transferring a glove (100) from a conveyor (200). The glove (100) is provided on a designated area on the conveyor (200) where the camera (10) from above captures images on the designated area of the conveyor (200). The images captured are sent to the processor for analysis to pinpoint the location of the cuff (101). The method of the present invention is specifically suited for the gloves (100).

In a preferred embodiment, the cuff (101) is in a colour distinctive from the glove (100) colour and the conveyor (200) colour, so that the cuff (101) can be distinguished in the images. For example, the cuff (101) in green colour is used when the conveyor (200) is black in colour and the glove (100) body is white in colour. The image captured is analyzed by the processor and the colour of the cuff (101) is differentiated from the remaining part of the image. A coordinate is assigned to the cuff (101) for the pick-up assembly to pick up cuff (101).

In another preferred embodiment, the cuff (101) is detected by the near infrared camera wherein the near infrared light penetration level is different on the glove (100) and the cuff (101) due to the difference in thickness. The cuff (101) is thicker than the other portion of the glove (100), and thus forms a basis for this detection method. The image obtained showing the contrast is then analyzed to locate the cuff (101) by assigning a coordinate to the cuff (101).

With the location of the glove (100) determined, the pick-up assembly (20) is moved accordingly to the glove (100) on the conveyor (200) by the robotic arm (40). Rotation or tilting of each of the plurality of the segments (41, 42, 43) is able to produce a three-dimensional movement according to the command from the processor.

When the pick-up assembly (20) is moved to directly above the cuff (101), the pair of inner grippers (21) then grips the cuff (101) and retracts to lift the glove (100) from the conveyor (200).

After the glove (100) is picked up by the pair of inner grippers (21), the two pairs of outer grippers (22) grabs one layer of the glove (100) fabric so that the glove (100) can be opened later on. The two pairs of the outer grippers (22) then slide apart with the rollers (23) along the glove (100) fabric to open the glove (100).

Figure 3:
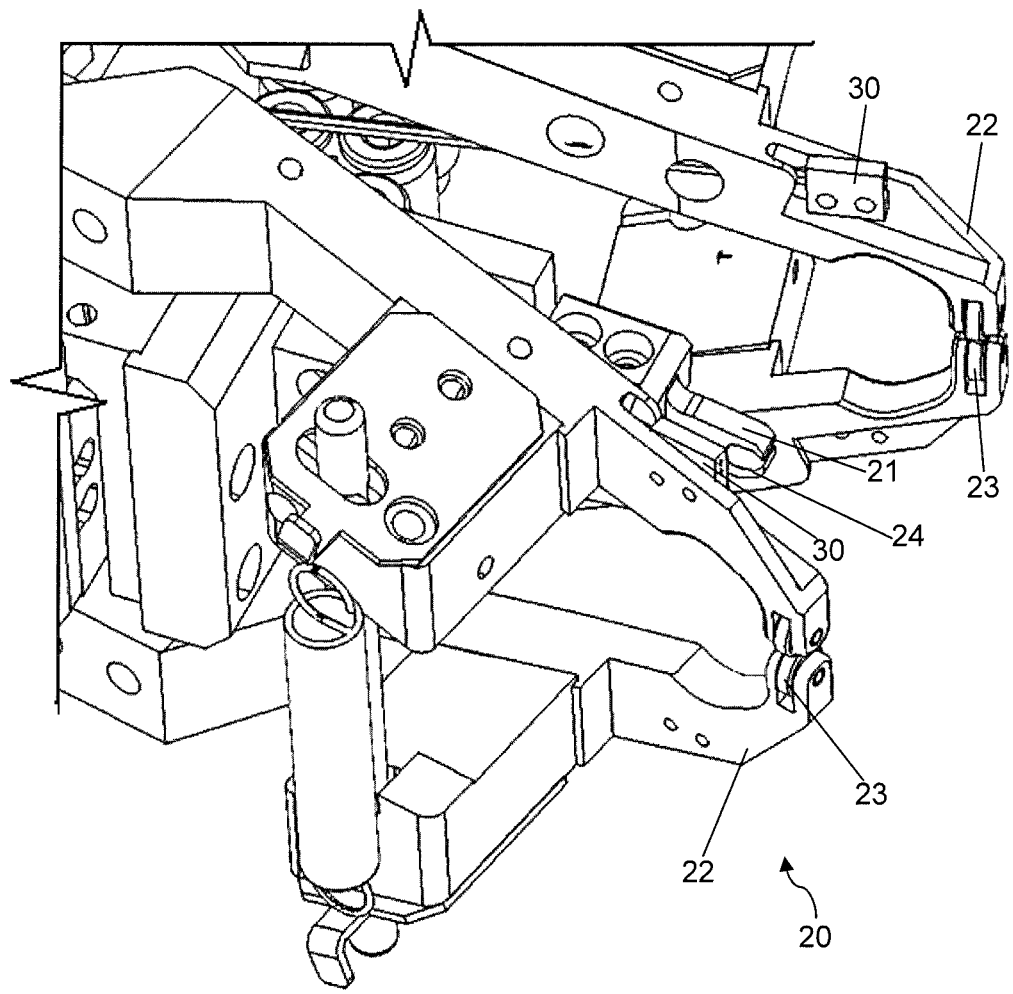
FIG. 3 is a diagram showing an enlarged view of a pick-up assembly of the apparatus for transferring gloves.
Figure 4:
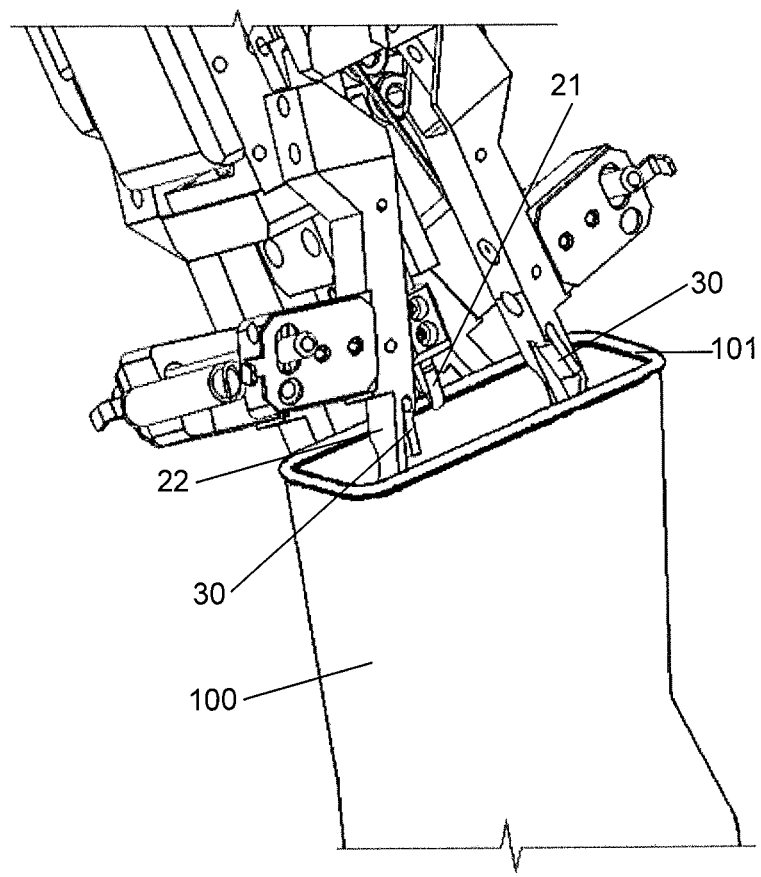
FIG. 4 is a diagram showing the pick-up assembly gripping a glove.

The pair of sensors (30) determines whether the glove (100) is positioned outward of the robotic arm (40) to enable engaging with the workstation (300) later. If the glove (100) is positioned toward the robotic arm (40), pick-up assembly will rotate 180° so that the glove (100) will be positioned outward of the robotic arm (40) as shown in FIG. 3.

The glove (100) is then shifted by using the robotic arm towards the workstation (300), for example, for glove (100) leakage inspection. In a preferred embodiment, air is blown into the glove (100) by using an air purge (302) from above for inflating the glove (100) before engaging with the workstation (300). This enables a higher success rate of the gloves (100) to be transferred to the workstation (300). The glove (100) is then transferred to the workstation (300) by engaging with the workstation (300). In a preferred embodiment, the glove (100) is lifted to a pair of retaining shafts (301) of the workstation (300), such that the pair of retaining shafts (301) goes into the glove (100) opening. The pair of the retaining shafts (301) is then moved apart to stretch and hold the glove (100). The pair of inner grippers (21) and the two pairs of outer grippers (22) then release the glove (100). The operation is then started with another cycle to transfer another glove (100) on the conveyor (200).

Although the present invention has been described with reference to specific embodiments, also shown in the appended figures, it will be apparent for those skilled in the art that many variations and modifications can be done within the scope of the invention as described in the specification and defined in the following claims.

Description of the reference numerals used in the accompanying drawings according to the present invention:

| Reference Numerals | Description |
| --- | --- |
| 10 | Camera |
| 20 | Pick-up assembly |
| 21 | Inner grippers |
| 22 | Outer grippers |
| 23 | Roller |
| 24 | Notch |
| 30 | Sensor |
| 40 | Robotic arm |
| 41 | Lower segment |
| 42 | Middle segment |
| 43 | Upper segment |
| 100 | Glove |
| 101 | Cuff |
| 200 | Conveyor |
| 300 | Workstation |
| 301 | Retaining shaft |
| 302 | Air purge |
| 400 | Frame structure |

I claim:

1. An apparatus for transferring a glove (100) from a conveyor (200), said apparatus comprising, a camera (10) for locating a cuff (101) of the glove (100) on the conveyor (200);
a pick-up assembly (20) comprising a pair of inner grippers (21) for gripping the cuff (101) and two pairs of outer grippers (22) for opening the glove (100);
a pair of sensors (30) for determining the position of the glove (100) gripped by the pair of inner grippers (21) and the two pairs of outer grippers (22);
a robotic arm (40) comprising a plurality of joined segments (41, 42, 43), wherein one of the plurality of the segments (43) is mounted with the pick-up assembly (20), for moving the pick-up assembly (20) in different directions; and
a processor electrically connected to the camera (10), the pick-up assembly (20), the sensor (30), and the robotic arm (40), for receiving signals from the camera (10) and the pair of sensors (30) and sending commands to the pick-up assembly (20) and the robotic arm (40), and
wherein the two pairs of outer grippers (22) have rollers (23).

2. The apparatus according to claim 1, wherein the camera (10) is a colour charged coupled device camera.

3. The apparatus according to claim 1, wherein the camera (10) is a near infrared camera.

4. The apparatus according to claim 1, wherein the pair of inner grippers (21) and the two pairs of outer grippers (22) are pneumatically actuated.

5. The apparatus according to claim 1, wherein the robotic arm (40) comprises a lower segment (41) for horizontal rotation, a middle segment (42) for vertical rotation, and an upper segment (43) for axial rotation.

6. The apparatus according to claim 1, wherein the pair of sensors (30) is a pair of optical sensors.

7. The apparatus according to claim 1, wherein each sensor of the pair of sensors (30) is provided on an outward side of each pair of the two pairs of outer grippers (22).

8. The apparatus according to claim 1, wherein detection of glove (100) by either or both of the pair of sensors (30) indicates the glove (100) is positioned outward of the robotic arm and absence of detection by both of the pair of the sensors indicates the glove (100) is positioned toward the robotic arm.

9. A method for transferring a glove (100) from a conveyor (200), said method comprises
locating a cuff (101) of the glove (100) on the conveyor (200) by capturing an image on the conveyor (200) with a camera (10) and analyzing the image with a processor;
using a robotic arm (40) to move a pick-up assembly (20) to the located cuff (101);
gripping the cuff (101) with a pair of inner grippers (21) of the pick-up assembly (20) and lifting the glove (100) by retracting the pair of inner grippers (21);
opening the glove (100) by grabbing the glove (100) with the two pairs of outer grippers (22) of the pick-up assembly (20) and sliding apart the two pairs of outer grippers (22);
detecting the glove (100) position being held by the pair of inner grippers (21) by using a pair of sensors (30);
rotating the pick-up assembly if the glove (100) is not positioned outward of the robotic arm (40);
shifting the glove (100) towards a workstation (300) by using the robotic arm (40); and
transferring the glove (100) to the workstation (300) by engaging the glove (100) to the workstation (300), and
wherein analysis of the image is conducted by differentiating the colour of the cuff (101) from another part of the image and assigning a coordinate to the cuff (101).

10. A method for transferring a glove (100) from a conveyor (200), said method comprises
locating a cuff (101) of the glove (100) on the conveyor (200) by capturing an image on the conveyor (200) with a camera (10) and analyzing the image with a processor;
using a robotic arm (40) to move a pick-up assembly (20) to the located cuff (101);
gripping the cuff (101) with a pair of inner grippers (21) of the pick-up assembly (20) and lifting the glove (100) by retracting the pair of inner grippers (21);
opening the glove (100) by grabbing the glove (100) with the two pairs of outer grippers (22) of the pick-up assembly (20) and sliding apart the two pairs of outer grippers (22);
detecting the glove (100) position being held by the pair of inner grippers (21) by using a pair of sensors (30);
rotating the pick-up assembly if the glove (100) is not positioned outward of the robotic arm (40);
shifting the glove (100) towards a workstation (300) by using the robotic arm (40); and
transferring the glove (100) to the workstation (300) by engaging the glove (100) to the workstation (300), and
wherein the cuff (101) is in a colour distinctive from the glove (100) colour and the conveyor (200) colour.

11. The method according to claim 10, wherein opening the glove (100) is facilitated by blowing air into the glove (100) by using an air purge (302) before engaging with the workstation (300).

12. The method according to claim 10, wherein the step of engaging the glove (100) to the workstation (300) comprises lifting the glove (100) to a pair of retaining shafts (100) of the workstation (300); moving apart said pair of retaining shafts (301) to stretch and hold the glove (100); releasing the glove (100) from the pair of inner grippers (21) and the two pairs of outer grippers (22).

13. The method according to claim 10, wherein the image is captured by a near infrared camera to show the difference in thickness of the glove (100) and the cuff (101).

14. The method according to claim 13, wherein analysis of image is conducted by differentiating the thickness of the cuff (101) and assigning a coordinate to the cuff (101).

* * * * *